(12) United States Patent
Burgess et al.

(10) Patent No.: US 10,738,836 B2
(45) Date of Patent: Aug. 11, 2020

(54) ADJUSTABLE TORQUE ASSEMBLY

(71) Applicant: SAINT-GOBAIN PERFORMANCE PLASTICS RENCOL LIMITED, Coventry (GB)

(72) Inventors: James K. Burgess, Bristol (GB); Neil James, Chepstow (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 269 days.

(21) Appl. No.: 15/825,346

(22) Filed: Nov. 29, 2017

(65) Prior Publication Data
US 2018/0149208 A1 May 31, 2018

Related U.S. Application Data

(60) Provisional application No. 62/428,357, filed on Nov. 30, 2016.

(51) Int. Cl.
*F16D 7/02* (2006.01)
*B25B 23/14* (2006.01)

(52) U.S. Cl.
CPC ............ *F16D 7/028* (2013.01); *B25B 23/141* (2013.01); *F16D 2250/0084* (2013.01); *F16D 2300/06* (2013.01)

(58) Field of Classification Search
CPC ................. F16D 7/028; F16D 2300/06; F16D 2250/0084; B25B 23/141
USPC ...................................................... 464/10, 43
See application file for complete search history.

(56) References Cited

U.S. PATENT DOCUMENTS

| 1,942,512 | A | * | 1/1934 | Lee | .......................... F16D 7/028 |
| | | | | | 464/43 |
| 2,244,143 | A | * | 6/1941 | Dowler | ................... B23B 31/38 |
| | | | | | 464/43 |
| 2,771,804 | A | | 11/1956 | Better et al. | |
| 3,717,367 | A | | 2/1973 | Peter et al. | |
| 3,934,688 | A | | 1/1976 | Sides et al. | |
| 3,955,368 | A | | 5/1976 | Becker | |
| 4,220,230 | A | | 9/1980 | Hansen | |
| 4,293,060 | A | | 10/1981 | Miller | |
| 4,302,937 | A | | 12/1981 | Aubert | |
| 4,347,715 | A | | 9/1982 | Carman et al. | |

(Continued)

FOREIGN PATENT DOCUMENTS

| CN | 2112720 U | 8/1992 |
| CN | 2192762 Y | 3/1995 |

(Continued)

OTHER PUBLICATIONS

International Search Report for PCT/EP2017/080836, dated Feb. 20, 2018, 12 pages.

*Primary Examiner* — Greg Binda
(74) *Attorney, Agent, or Firm* — Abel Schillinger, LLP; Chi Suk Kim (57) ABSTRACT

A torque assembly including an outer component, an inner component fitted within the outer component, and a tolerance ring provided between the outer component and the inner component to transmit torque between the inner and outer components, wherein torque transferred between the inner and outer components is adjustable by modifying the axial spacing between the inner component and the outer component.

20 Claims, 3 Drawing Sheets

(56) References Cited

U.S. PATENT DOCUMENTS

| | | |
|---|---|---|
| 4,457,735 A | 7/1984 | Carman et al. |
| 4,474,072 A | 10/1984 | Hallenstvedt |
| 4,702,359 A | 10/1987 | Mancuso et al. |
| 4,905,805 A | 3/1990 | Grimm |
| 4,984,667 A | 1/1991 | Tjaden |
| 5,002,517 A | 3/1991 | Heidenreich et al. |
| 5,020,650 A | 6/1991 | Heidenreich et al. |
| 5,040,643 A | 8/1991 | Chapman et al. |
| 5,135,088 A | 8/1992 | Heidenreich et al. |
| 5,230,142 A | 7/1993 | Roscizewski |
| 5,295,909 A | 3/1994 | Heidenreich |
| 5,301,505 A | 4/1994 | Wright |
| 5,466,082 A | 11/1995 | Sherar |
| 5,558,182 A | 9/1996 | De La Fuente et al. |
| 5,571,184 A | 11/1996 | Desatnick |
| 5,681,135 A | 10/1997 | Simonson |
| 5,681,222 A | 10/1997 | Hansen et al. |
| 5,807,179 A | 9/1998 | Hansen et al. |
| 5,857,913 A | 1/1999 | Fujimura et al. |
| 6,056,473 A | 5/2000 | Schäfer |
| 6,105,743 A | 8/2000 | Salecker et al. |
| 6,170,627 B1 | 1/2001 | Lindenthal |
| 6,386,338 B1 | 5/2002 | Powrozek |
| 6,386,351 B1 | 5/2002 | Salecker et al. |
| 6,378,679 B1 | 8/2002 | Karjalainen et al. |
| 6,745,883 B2 | 6/2004 | Eto et al. |
| 7,040,470 B2 | 5/2006 | Dion |
| 7,922,591 B2 | 4/2011 | Claeys |
| 7,967,683 B2 | 4/2011 | Chuang |
| 8,047,919 B2 | 11/2011 | Arden et al. |
| 8,062,137 B2 | 11/2011 | Arden et al. |
| 8,672,110 B2 | 3/2014 | Jaeger |
| 8,746,101 B2 | 6/2014 | Hausladen et al. |
| 9,188,178 B2 | 11/2015 | Ishiguro et al. |
| 9,255,612 B2 | 2/2016 | Hauptmann |
| 2001/0035327 A1 | 11/2001 | Itoh |
| 2002/0066623 A1 | 6/2002 | Powrozek |
| 2002/0134637 A1 | 9/2002 | Salecker et al. |
| 2004/0211639 A1 | 10/2004 | Dion |
| 2006/0159514 A1 | 7/2006 | Schussler |
| 2006/0223640 A1 | 10/2006 | Bassett et al. |
| 2007/0298888 A1 | 12/2007 | Balczun |
| 2009/0186706 A1 | 7/2009 | Arden et al. |
| 2009/0253521 A1 | 10/2009 | Arden et al. |
| 2010/0018825 A1 | 1/2010 | Claeys |
| 2010/0078284 A1 | 4/2010 | Nilsson et al. |
| 2010/0230228 A1 | 9/2010 | Wernecke |
| 2010/0326784 A1 | 12/2010 | Knowles |
| 2011/0027006 A1 | 2/2011 | Hausladen et al. |
| 2011/0130210 A1 | 6/2011 | Balczun |
| 2011/0182660 A1 | 7/2011 | Kemmler et al. |
| 2012/0073928 A1 | 3/2012 | Jaeger |
| 2012/0237152 A1 | 9/2012 | Wheals |
| 2013/0133999 A1 | 5/2013 | Ishiguro et al. |
| 2013/0161150 A1 | 6/2013 | McCrary |
| 2013/0319150 A1 | 12/2013 | Carlton et al. |
| 2014/0011598 A1 | 1/2014 | Wang et al. |
| 2014/0161519 A1 | 6/2014 | Slayne et al. |
| 2014/0309041 A1 | 10/2014 | Müller et al. |
| 2014/0323262 A1 | 10/2014 | Carlton et al. |
| 2015/0096862 A1 | 4/2015 | Hauptmann |
| 2015/0114549 A1 | 4/2015 | Slayne et al. |
| 2015/0148176 A1 | 5/2015 | Schroeder et al. |
| 2015/0252855 A1 | 9/2015 | Jakoubek |
| 2016/0230866 A1 | 8/2016 | Lingren et al. |

FOREIGN PATENT DOCUMENTS

| | | |
|---|---|---|
| CN | 2448997 Y | 9/2001 |
| CN | 1394260 A | 1/2003 |
| CN | 2729418 Y | 9/2005 |
| CN | 1779283 A | 5/2006 |
| CN | 2849308 Y | 12/2006 |
| CN | 2849309 Y | 12/2006 |
| CN | 1977115 A | 6/2007 |
| CN | 200965016 Y | 10/2007 |
| CN | 100365305 C | 1/2008 |
| CN | 101203693 A | 6/2008 |
| CN | 201125970 Y | 10/2008 |
| CN | 101363483 A | 2/2009 |
| CN | 201202748 Y | 3/2009 |
| CN | 201209632 Y | 3/2009 |
| CN | 101495769 A | 7/2009 |
| CN | 101561016 A | 10/2009 |
| CN | 101561020 A | 10/2009 |
| CN | 201407295 Y | 2/2010 |
| CN | 201448381 U | 5/2010 |
| CN | 201531538 U | 7/2010 |
| CN | 101852258 A | 10/2010 |
| CN | 101865218 A | 10/2010 |
| CN | 101929509 A | 12/2010 |
| CN | 101939556 A | 1/2011 |
| CN | 201730975 U | 2/2011 |
| CN | 101994768 A | 3/2011 |
| CN | 201763846 U | 3/2011 |
| CN | 101561016 B | 4/2011 |
| CN | 102032285 A | 4/2011 |
| CN | 101203693 B | 6/2011 |
| CN | 201884502 U | 6/2011 |
| CN | 201953852 U | 8/2011 |
| CN | 102221052 A | 10/2011 |
| CN | 1977115 B | 11/2011 |
| CN | 102245920 A | 11/2011 |
| CN | 202073948 U | 12/2011 |
| CN | 102312943 A | 1/2012 |
| CN | 102322487 A | 1/2012 |
| CN | 202108895 U | 1/2012 |
| CN | 101363483 B | 4/2012 |
| CN | 102518690 A | 6/2012 |
| CN | 101994768 B | 7/2012 |
| CN | 102537133 A | 7/2012 |
| CN | 202301529 U | 7/2012 |
| CN | 102322487 B | 8/2012 |
| CN | 102630281 A | 8/2012 |
| CN | 202402506 U | 8/2012 |
| CN | 202431771 U | 9/2012 |
| CN | 102032285 B | 10/2012 |
| CN | 102777505 A | 11/2012 |
| CN | 202597531 U | 12/2012 |
| CN | 101865218 B | 1/2013 |
| CN | 102900782 A | 1/2013 |
| CN | 202646452 U | 1/2013 |
| CN | 202659757 U | 1/2013 |
| CN | 101561020 B | 3/2013 |
| CN | 202768691 U | 3/2013 |
| CN | 202833716 U | 3/2013 |
| CN | 202851735 U | 4/2013 |
| CN | 202901094 U | 4/2013 |
| CN | 103104629 A | 5/2013 |
| CN | 103115085 A | 5/2013 |
| CN | 103122948 A | 5/2013 |
| CN | 203114949 U | 8/2013 |
| CN | 103291774 A | 9/2013 |
| CN | 103352924 A | 10/2013 |
| CN | 203239790 U | 10/2013 |
| CN | 203239791 U | 10/2013 |
| CN | 203335666 U | 12/2013 |
| CN | 203362887 U | 12/2013 |
| CN | 103498880 A | 1/2014 |
| CN | 103527651 A | 1/2014 |
| CN | 203395047 U | 1/2014 |
| CN | 103615472 A | 3/2014 |
| CN | 103629261 A | 3/2014 |
| CN | 103629279 A | 3/2014 |
| CN | 103671607 A | 3/2014 |
| CN | 103671608 A | 3/2014 |
| CN | 203500320 U | 3/2014 |
| CN | 203548629 U | 4/2014 |
| CN | 103857935 A | 6/2014 |
| CN | 203627578 U | 6/2014 |
| CN | 203641320 U | 6/2014 |
| CN | 203641323 U | 6/2014 |
| CN | 203655982 U | 6/2014 |
| CN | 203685914 U | 7/2014 |

(56) References Cited

FOREIGN PATENT DOCUMENTS

| | | |
|---|---|---|
| CN | 102900782 B | 9/2014 |
| CN | 104110445 A | 10/2014 |
| CN | 203962766 U | 11/2014 |
| CN | 102245920 B | 12/2014 |
| CN | 104254704 A | 12/2014 |
| CN | 104455082 A | 3/2015 |
| CN | 104565119 A | 4/2015 |
| CN | 103115085 B | 7/2015 |
| CN | 104863990 A | 8/2015 |
| CN | 104989745 A | 10/2015 |
| CN | 204704291 U | 10/2015 |
| CN | 103527651 B | 11/2015 |
| CN | 204755660 U | 11/2015 |
| CN | 102630281 B | 1/2016 |
| CN | 103291774 B | 1/2016 |
| CN | 105422688 A | 3/2016 |
| CN | 104110445 B | 4/2016 |
| CN | 105465210 A | 4/2016 |
| DE | 3120303 A1 | 10/1982 |
| DE | 10060703 A1 | 9/2001 |
| DE | 10201384 A1 | 9/2002 |
| DE | 69922875 T2 | 4/2006 |
| DE | 202008008849 U1 | 4/2009 |
| DE | 102011084713 A1 | 4/2013 |
| EP | 0523972 A2 | 1/1993 |
| EP | 0523972 B1 | 3/1997 |
| EP | 1150032 A2 | 10/2001 |
| EP | 2085631 A1 | 8/2009 |
| EP | 2314893 A1 | 4/2011 |
| EP | 2436944 A2 | 4/2012 |
| EP | 2500596 A2 | 9/2012 |
| EP | 2600023 A2 | 6/2013 |
| EP | 2500596 A3 | 8/2013 |
| EP | 2799735 A2 | 11/2014 |
| EP | 2500596 B1 | 2/2016 |
| EP | 3091243 A1 | 11/2016 |
| FR | 2415231 A1 | 8/1979 |
| GB | 1220316 A | 1/1971 |
| GB | 2211562 A | 7/1989 |
| GB | 2297369 A | 7/1996 |
| GB | 2319818 A | 6/1998 |
| GB | 2319820 A | 6/1998 |
| GB | 2319818 B | 10/1998 |
| GB | 2319820 B | 10/1998 |
| GB | 2324583 A | 10/1998 |
| GB | 2325036 A | 11/1998 |
| GB | 2324583 B | 12/1998 |
| GB | 2325036 B | 12/1998 |
| GB | 2297369 B | 3/1999 |
| GB | 2319815 B | 8/2000 |
| GB | 2366845 A | 3/2002 |
| JP | H08159185 A | 6/1996 |
| JP | 3284799 B2 | 5/2002 |
| JP | 2002195318 A | 7/2002 |
| JP | 2004509297 A | 3/2004 |
| JP | 2005299849 A | 10/2005 |
| JP | 2006022866 A | 1/2006 |
| JP | 2006125442 A | 5/2006 |
| JP | 2007064401 A | 3/2007 |
| JP | 2009257404 A | 11/2009 |
| JP | 2010507759 A | 3/2010 |
| JP | 2010112424 A | 5/2010 |
| JP | 4517754 B2 | 8/2010 |
| JP | 2010216553 A | 9/2010 |
| JP | 4674826 B2 | 4/2011 |
| JP | 4703864 B2 | 6/2011 |
| JP | 4860894 B2 | 1/2012 |
| JP | 2012122538 A | 6/2012 |
| JP | 5199925 B2 | 5/2013 |
| JP | 2013113417 A | 6/2013 |
| JP | 2014074500 A | 4/2014 |
| JP | 5492176 B2 | 5/2014 |
| JP | 2014081079 A | 5/2014 |
| WO | 2004097242 A1 | 11/2004 |
| WO | 2005111473 A2 | 11/2005 |
| WO | 2008002845 A2 | 1/2008 |
| WO | 2009098148 A1 | 8/2009 |
| WO | 2011036126 A1 | 3/2011 |
| WO | 2011048186 A1 | 4/2011 |
| WO | 2013090510 A1 | 6/2013 |
| WO | 2013127007 A1 | 9/2013 |
| WO | 2013162734 A1 | 10/2013 |
| WO | 2018099982 A1 | 6/2018 |

* cited by examiner

ADJUSTABLE TORQUE ASSEMBLY

CROSS-REFERENCE TO RELATED APPLICATION(S)

This application claims priority under 35 U.S.C. § 119(e) to U.S. Provisional Application No. 62/428,357 entitled "ADJUSTABLE TORQUE ASSEMBLY," by James K. BURGESS et al., filed Nov. 30, 2016, which is assigned to the current assignee hereof and incorporated herein by reference in its entirety.

FIELD OF THE DISCLOSURE

This disclosure relates to an apparatus comprising mating inner and outer components, which are mounted together with the use of a tolerance ring. By non-limiting example, the apparatus can be used for a torque assembly.

BACKGROUND

A torque assembly can be used to adjust, enhance, or limit the amount of torque being transferred from a torque supplying input (such as a shaft), to a torque receiving output (such as an appliance). Torque assemblies can provide rotating mechanical power in transmission systems to prevent damage to mechanical equipment. A torque assembly can lessen torque and provide torque overload protection for many types of transmission systems. A torque assembly can enhance torque for many types of transmission systems. In a number of applications, the torque supplying input may be connected to a torque generating device powered by wind, water, fluid, oil, steam, gas or the like. In a number of variations, the torque receiving output may be an electrical generator, tool, or industrial machinery requiring an input of torque for operation.

Problems can occur in torque assemblies due to overload situations, larger size and complexity of assembly, varying torque over a lifetime due to wear or abrasion of the components of the assembly, or performance of the torque assembly components being dependent on temperature or other conditions.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the torque assembly and tolerance ring arts.

A torque assembly in accordance with one or more embodiments described herein can include an outer component; an inner component fitted within the outer component; and a tolerance ring provided between the outer component and the inner component to transmit torque between the inner and outer components, wherein torque transferred between the inner and outer components is adjustable by modifying the axial spacing between the inner component and the outer component. In at least one embodiment the torque assembly can include an outer component; an inner component fitted within the outer component; and a tolerance ring provided between the outer component and the inner component comprising a plurality of wave structures about a central axis that define an inner diameter and an outer diameter, at least one of the inner component or outer component abutting against the wave structures, wherein at least one of the inner component, the outer component, or the tolerance ring has a sloped exterior surface in an axial direction. In an embodiment the torque assembly can include an outer component; an inner component fitted within the outer component; and a tolerance ring provided between the outer component and the inner component adapted to adjust torque by modifying the radial spacing between the inner component and the outer component. In another embodiment the torque assembly can include an outer component; an inner component fitted within the outer component; and a tolerance ring provided between the outer component and the inner component adapted to adjust torque by modifying the axial and radial spacing between the inner component and the outer component. In at least one embodiment the torque assembly can include an outer component; an inner component fitted within the outer component; and a tolerance ring provided between the outer component and the inner component adapted to adjust torque by modifying the radial spacing between the inner component and the outer component wherein the torque assembly has an adjusted torque value between about 1 to about 20 N·m between the inner component and the outer component.

In an embodiment, at least one of the inner component, outer component, or tolerance ring forms a frustoconical or conical shape. In an embodiment, the outer component comprises a first piece and a second piece. In an embodiment, the outer component first piece comprises a first coupling component and the second piece comprises a second coupling component. In an embodiment, the torque assembly comprises a locking mechanism. In an embodiment, the outer component comprises an outer component input/output connector. In an embodiment, the outer component input/output connector has a non-round cross-section. In an embodiment, the inner component comprises an inner component input/output connector. In an embodiment, the inner component input/output connector has a non-round cross-section. In an embodiment, the torque assembly may include a lubricant applied to or coated on a surface of at least one of the tolerance ring, the inner component, or the outer component. In an embodiment, the torque assembly has a torque value setting mechanism capable of setting the torque value of the torque assembly at a constant level when engaged. In an embodiment, the radius of the outer component $R_H$ with respect to a central axis may be less than about 20 mm. In an embodiment, the torque assembly further comprises a cup spring washer in contact with the outer component and the inner component. In an embodiment, the sloped exterior surface of the inner component, the outer component, or the tolerance ring forms an angle α with respect to a line parallel to the central axis, and wherein a may be at least 1°. In an embodiment, the sloped exterior surface of the inner component, the outer component, or the tolerance ring is adapted to frictionally engage at least one of an inner component, outer component or tolerance ring exterior surfaces. In an embodiment, at least one wave structure of the tolerance ring is adapted to deform via compression in the radial direction.

Figure 1:
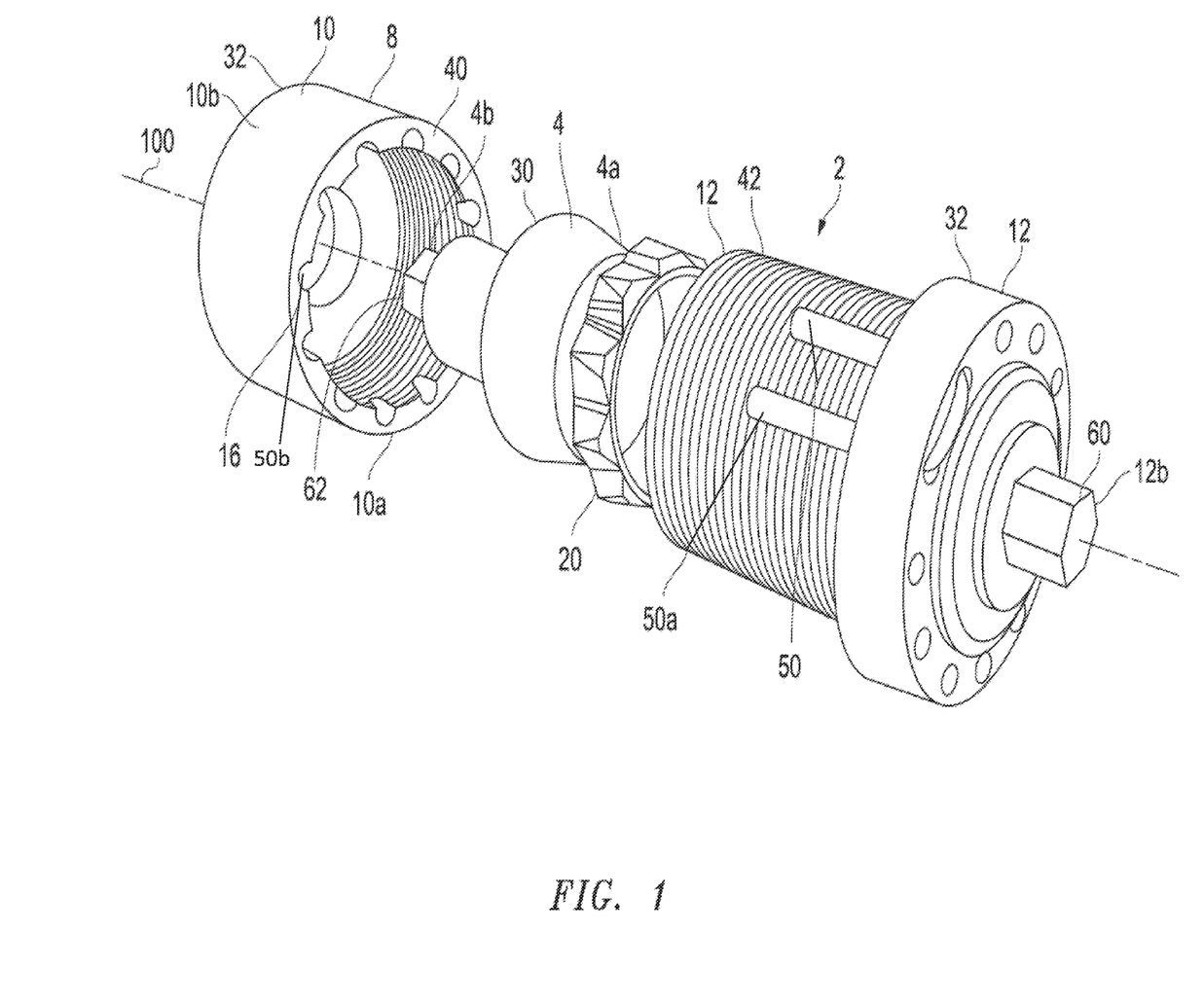
FIG. 1 is perspective view of a torque assembly according to an embodiment of the invention.
Figure 2A:
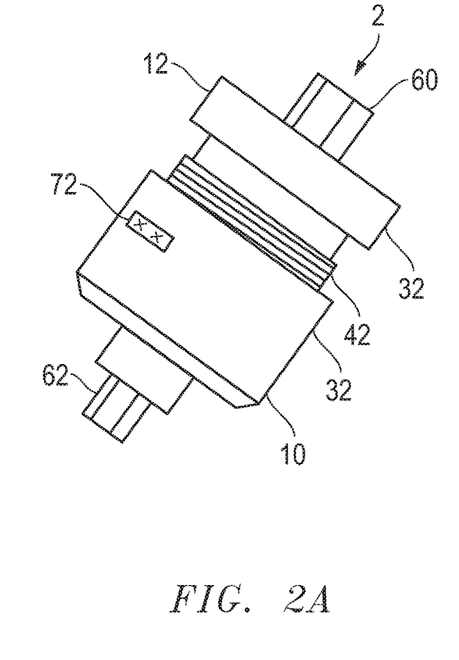
FIG. 2A is a perspective view of a torque assembly according to an embodiment of the invention.
Figure 2B:
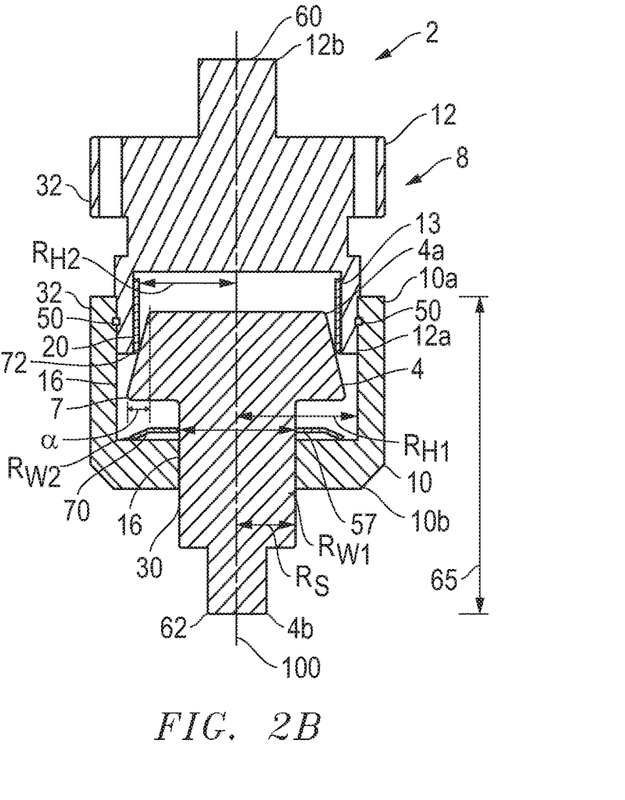
FIG. 2B is a cross-sectional view of a torque assembly according to an embodiment of the invention.
Figure 2C:
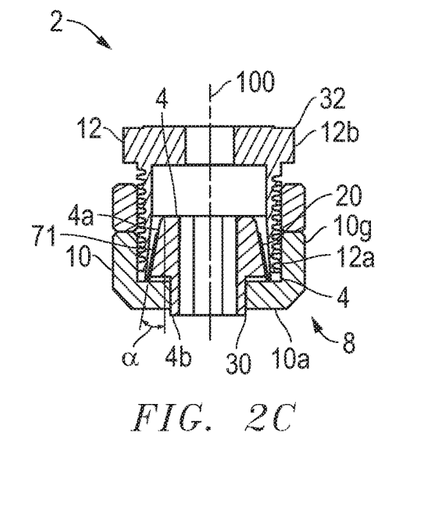
FIG. 2C is a cross-sectional view of a torque assembly according to an embodiment of the invention.
Figure 2D:
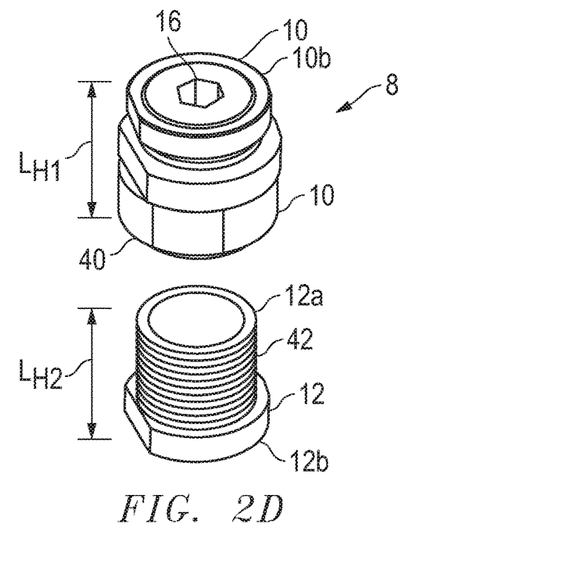
FIG. 2D is a perspective view of at least some components of a torque assembly according to an embodiment of the invention.

Referring initially to FIGS. 1-2B, a torque assembly 2 generally includes a torque supplying input and a torque receiving output directed along a central axis 100 that axially down the cross-section of the torque assembly. In an embodiment, the torque supplying input may be in the form of a shaft 4 having a first end 4a and a second end 4b. In another embodiment, the torque supplying input can be operatively connected to or engaged with the shaft 4. The torque supplying input may be in the form of a shaft having a conical or frustoconical first end 4a. In an embodiment, the torque receiving output may be in the form of a housing 8. In another embodiment, the torque receiving output can be operatively connected to or engaged with the housing 8. The housing 8 may be a single solid component piece. The housing 8 may have a first piece 10 and a second piece 12. The first piece 10 may have a first axial end 10a and a second axial end 10b along the axial length of the first piece 10. The second piece 12 may have a first axial end 12a and a second axial end 12b along the axial length of the second piece 12. In an embodiment, the torque supplying input and the torque receiving output may be operatively coupled together. The torque supplying input can be coupled to a torque generating device (not illustrated) while the torque receiving output may be coupled to a machine requiring torque (not illustrated). In an embodiment, the torque receiving output may be in the form of or operatively connected to a shaft 4, and the torque supplying input may be in the form of or operatively connected to a housing 8. In another embodiment, the torque receiving output may be in the form of or operatively connected to a housing 8, and the torque supplying input may be in the form of or operatively connected to a shaft 4. In a number of embodiments, the torque supplying input may be an inner component 30, and the torque receiving output may be an inner component 30. In a number of embodiments, the torque supplying input may be an outer component 32, and the torque receiving output may be an outer component 32. In an embodiment the inner component 30 can be receivable into a bore 16 formed in an outer component 32. The inner and outer components 30, 32 can at least partially mate with each other through insertion of the shaft 4 into the bore 16. The inner component 30 may be the shaft 4 and the outer component 32 may be the first piece 10 and second piece of the housing 12.

In an embodiment, as shown in in FIGS. 1-3C, the torque assembly 2 may further include a tolerance ring 20. The tolerance ring 20 may be provided between the inner component and the outer component. In an embodiment, the tolerance ring 20 may be provided between the shaft 4 and the housing 8. The tolerance ring 20 may be adapted to adjust or modify torque between the inner component 30 and the outer component 32 by modifying the axial or radial spacing between the inner component 30 and the outer component 32 to modify or set a torque value for the torque assembly 2. The tolerance ring 20 can be frictionally coupled to at least one of the inner or outer components 30, 32. That is, engagement between the tolerance ring 20 and one of the inner or outer components 30, 32 can occur through frictional resistance. In an embodiment, the outer component 32 or housing 8 may be made of a material conventional in the art such as, but not limited to, a metal or metal alloy, a polymer, or a composite material. In an embodiment, the inner component 30 or shaft 4 may be made of a material conventional in the art such as, but not limited to, a metal or metal alloy, a polymer, or a composite material.

Figure 3A:
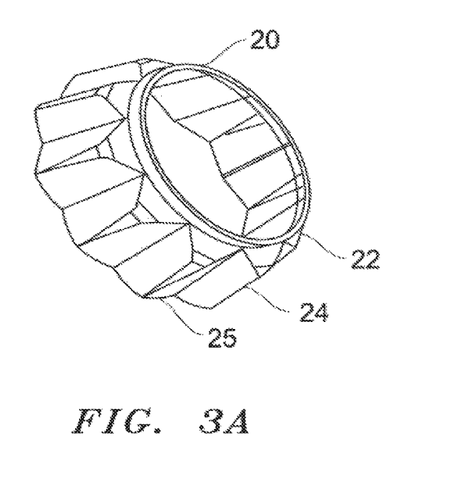
FIG. 3A is a perspective view of a tolerance ring of a torque assembly according to an embodiment of the invention.
Figure 3B:
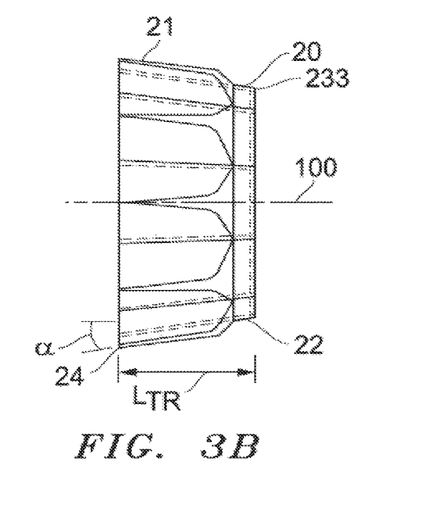
FIG. 3B is a side view of a tolerance ring of a torque assembly according to an embodiment of the invention.
Figure 3C:
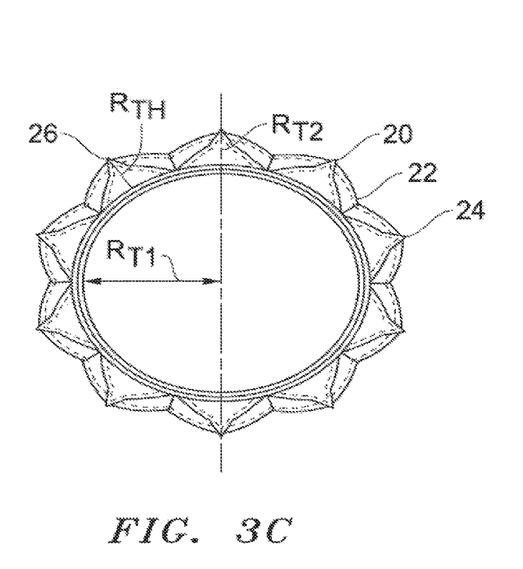
FIG. 3C is a front view of a tolerance ring of a torque assembly according to an embodiment of the invention.

In an embodiment, the tolerance ring 20 can be provided to fit the inner and outer component 30, 32 together and compensate for variations in the manufacturing process of those components which cause variations in their dimensions. As shown in FIGS. 3A-3C, the tolerance ring 20 can comprise an annular band 22. The annular band 22 may include at least one projection (or "wave structure") 24 that extends radially therefrom. The projections 24 can be formed into a flat strip, which is subsequently formed into the curved annular band 22. The projections 24 can be deformable or adapted to deform in the radial direction via compression when placed between the inner and outer components 30, 32. In an embodiment, at least some of the projections 24 can extend in the same direction, which in this embodiment is radially outwardly from the band 22. In an embodiment, the projections 24 may form apexes 26 sloped radially outward from the annular band 22. The present disclosure is not intended to be limited to those embodiments illustrated in FIGS. 3A-3C. In a non-illustrated embodiment, the projections have staggered heights relative to one another. In a more particular embodiment, alternating projections can have alternating radial heights $R_{TH}$. In another more particular embodiment, at least three of the projections can have a first radial height and the remaining projections can have a second radial height different than the first radial height. In an embodiment, the tolerance ring 20 be made of a material conventional in the art such as, but not limited to, a metal or metal alloy, a polymer, a ceramic, or a composite material.

In an embodiment, the tolerance ring 20 may have an inner radius $R_H$ of at least 5 mm, at least 10 mm, at least 15 mm, at least 20 mm, at least 30 mm, at least 40 mm. The inner radius $R_H$ may be no greater than 5 mm, no greater than 10 mm, no greater than 15 mm, no greater than 20 mm, no greater than 30 mm, no greater than 40 mm. In an embodiment, the tolerance ring 20 may have an outer radius $R_{T2}$ of at least 5 mm, at least 10 mm, at least 15 mm, at least 20 mm, at least 30 mm, at least 40 mm. The outer radius $R_{T2}$ may be no greater than 5 mm, no greater than 10 mm, no greater than 15 mm, no greater than 20 mm, no greater than 30 mm, no greater than 40 mm. In an embodiment, the tolerance ring 20 can have an axial length, $L_{TR}$, as measured between axial ends 21 and 23, of no greater than 5 mm, no greater than 10 mm, no greater than 15 mm, no greater than 20 mm, no greater than 30 mm, no greater than 40 mm. The tolerance ring 20 can have an axial length, $L_{TR}$, as measured between axial ends 21 and 23, of at least 5 mm, at least 10 mm, at least 15 mm, at least 20 mm, at least 30 mm, at least 40 mm. In an embodiment, the tolerance ring 20 may be sloped in the axial direction along an exterior surface 25 of the tolerance ring 20. The tolerance ring 20 may be sloped in the axial direction to form an angle α with respect to a line parallel to the central axis 100. The angle α may be at least about 1°, at least about 5°, at least about 10°, at least about 15°, at least about 20°, at least about 25°, at least about 30°, at least about 35°, at least about 40, at least about 45°, at least about 50°. In an embodiment, the exterior surface 13 of the second piece 12 of the housing 8 or outer component 32 may be sloped in the axial direction to form an angle α with respect to a line parallel to the central axis 100. . . .

In an embodiment, the tolerance ring 20 can be monolithically formed from a single piece of material. The projections 24 can be stamped or otherwise formed in the piece of material. The tolerance ring 20 can then be rolled to a cylindrical, or generally cylindrical, shape, with the projections 24 extending radially inward or radially outward as desired. By way of a non-limiting example, the tolerance ring 20 can include at least 3 projections 24 extending radially from the annular 22, such as at least 4 projections, at least 5 projections, at least 6 projections, at least 7 projections, at least 8 projections, at least 9 projections, or even at least 10 projections. The projections 24 can be evenly spaced apart in a circumferential direction around the tolerance ring 20. In a non-illustrated embodiment, each projection can include a plurality of projections extending in an axial direction. That is, each projection can include a plurality of smaller projections at least partially occupying a similar footprint as the previously described projection. In an embodiment, the tolerance ring 20 can be formed as a split ring, i.e., the tolerance ring 20 includes an axially extending gap.

FIG. 2B includes a cross section view of the torque assembly 2 in the installed state, i.e., after installation of the tolerance ring 20 between the inner component 30 and the outer component 32 according to at least one embodiment. In an embodiment, the projections 24 are compressed between the inner component 30 and the outer component 32 as viewed in the installed state. In an embodiment, each of the projections 24 can have a radial stiffness of less than 1000 N/mm, such as less than 750 N/mm, less than 500 N/mm, less than 250 N/mm, less than 200 N/mm, less than 150 N/mm, less than 100 N/mm, less than 50 N/mm, less than 25 N/mm, less than 10 N/mm, less than 5 N/mm, less than 4 N/mm, less than 3 N/mm, less than 2 N/mm, or even less than 1 N/mm. The radial stiffness can be greater than 0 N/mm.

In an embodiment, the shaft 4 or inner component 30 may be sloped in the axial direction at the first end 4a. At least one of the first end 4a or the second end 4b of the shaft 4 or inner component 30 may be sloped in the axial direction along an exterior surface 7 to form an angle α with respect to a line parallel to the central axis 100. The angle α may be at least about 1°, at least about 5°, at least about 10°, at least about 15°, at least about 20°, at least about 25°, at least about 30°, at least about 35°, at least about 40, at least about 45°, at least about 50°. In an embodiment, the radius of the shaft 4 or inner component 30 $R_S$ may be at least 5 mm, at least 10 mm, at least 15 mm, at least 20 mm, at least 30 mm, at least 40 mm. The radius of the shaft 4 or inner component 30 $R_S$ may be no greater than 5 mm, no greater than 10 mm, no greater than 15 mm, no greater than 20 mm, no greater than 30 mm, no greater than 40 mm.

In an embodiment, the shaft 4 or inner component 30 can have an axial length, $L_S$, as measured between axial ends 4a and 4b, of no greater than 5 mm, no greater than 10 mm, no greater than 15 mm, no greater than 20 mm, no greater than 30 mm, no greater than 40 mm. The shaft 4 or inner component 30 can have an axial length, $L_S$, as measured between axial ends 4a and 4b, of at least 5 mm, at least 10 mm, at least 15 mm, at least 20 mm, at least 30 mm, at least 40 mm. In an embodiment, the radius of the shaft 4 or inner component 30 $R_S$ may vary along its axial length, $L_S$.

In an embodiment, the housing 8 first piece 10 may include an exterior surface 11, and the housing 8 second piece 12 may include an exterior surface 13. In an embodiment, the housing 8 first piece 10 and/or second piece 12, or outer component 32 may be sloped in the axial direction along at least a part of its exterior surface 11, 13. In an embodiment, the exterior surface 11 of the first piece 10 of the housing 8 or outer component 32 may be sloped in the axial direction to form an angle α with respect to a line parallel to the central axis 100. The angle α may be at least about 1°, at least about 5°, at least about 10°, at least about 15°, at least about 20°, at least about 25°, at least about 30°, at least about 35°, at least about 40, at least about 45°, at least about 50°. In an embodiment, the exterior surface 13 of the second piece 13 of the housing 8 or outer component 32 may be sloped in the axial direction to form an angle α with respect to a line parallel to the central axis 100. The angle α may be at least about 1°, at least about 5°, at least about 10°, at least about 15°, at least about 20°, at least about 25°, at least about 30°, at least about 35°, at least about 40, at least about 45°, at least about 50°. In an embodiment, both of the first piece 10 of the housing 8 or outer component 32, and the second piece 13 of the housing 8 or outer component 32 may be sloped in the axial direct to form an angle α, α' with respect to a line parallel to the central axis 100. In an embodiment, the slope α of the first piece 10 of the housing 8 or outer component 32 may be the same or different than the slope α' of the second piece 13 of the housing 8 or outer component 32

In an embodiment, the radius of the first piece 10 of the housing 8 or outer component 30 $R_{H1}$ may be at least 5 mm, at least 10 mm, at least 15 mm, at least 20 mm, at least 30 mm, at least 40 mm. The radius of the first piece 10 of the housing 8 or outer component 30 $R_{H1}$ may be no greater than 5 mm, no greater than 10 mm, no greater than 15 mm, no greater than 20 mm, no greater than 30 mm, no greater than 40 mm. In an embodiment, the radius of the second piece 12 of the housing 8 or outer component 30 $R_{H2}$ may be at least 5 mm, at least 10 mm, at least 15 mm, at least 20 mm, at least 30 mm, at least 40 mm. The radius of the second piece 12 of the housing 8 or outer component 30 $R_{H2}$ may be no greater than 5 mm, no greater than 10 mm, no greater than 15 mm, no greater than 20 mm, no greater than 30 mm, no greater than 40 mm.

In an embodiment, the first piece 10 of the housing 8 can have an axial length, $L_{H1}$, as measured between axial ends 10a and 10b, of no greater than 5 mm, no greater than 10 mm, no greater than 15 mm, no greater than 20 mm, no greater than 30 mm, no greater than 40 mm. The first piece 10 of the housing 8 can have an axial length, $L_{H1}$, as measured between axial ends 10a and 10b, of at least 5 mm, at least 10 mm, at least 15 mm, at least 20 mm, at least 30 mm, at least 40 mm. In an embodiment, the second piece 12 of the housing 8 can have an axial length, $L_{H2}$, as measured between axial ends 12a and 12b, of no greater than 5 mm, no greater than 10 mm, no greater than 15 mm, no greater than 20 mm, no greater than 30 mm, no greater than 40 mm. The second piece 12 of the housing 8 can have an axial length, $L_{H2}$, as measured between axial ends 12a and 12b, of at least 5 mm, at least 10 mm, at least 15 mm, at least 20 mm, at least 30 mm, at least 40 mm.

In an embodiment, the first piece 10 of the housing 8 may include a first coupling component 40. In an embodiment, the second piece 12 of the housing 8 may include a second coupling component 42. The first coupling component 40 may pair with the second coupling component 42 to engage our couple the first piece 10 to the second piece 12. In an embodiment, the first coupling component 40 may pair or engage with the second coupling component 42 to at least partially surround the shaft 4 or inner component 30. In an embodiment, the first coupling component 40 may include a male attachment and the second coupling component 42 can include a female attachment. In an embodiment, the first coupling component 40 may include a female attachment and the second coupling component 42 can include a male attachment. In an embodiment, at least one of the first coupling component 40 or the second coupling component 42 may include screw threads or threadings, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, or may be coupled a different way.

In an embodiment, the torque assembly 2 may include a locking mechanism 50. The locking mechanism 50 may lock the outer component 32 or housing 8 in place with respect to the inner component 30 or shaft 4. In an embodiment, the locking mechanism 50 may lock the first piece 10 of the housing 8 in place with respect to the second piece 12 of the housing 8, or vice versa. In an embodiment, the locking mechanism 50 may include a pin, groove and stop, nut and bolt, nut and screw, latch, handle, locking nut, tie rivet, or may be locked another way. As shown in FIG. 1, in at least one embodiment, the locking mechanism 50 may include a screw 50a on the second piece 12 of the outer component 32, and a screw bore 50b on the first piece 10 of the outer component 32 to lock the torque assembly 2.

In an embodiment, the outer component 32 or housing 8 may include an outer component input/output connector 60. The outer component input/output connector 60 may connect the outer component 32 or housing 8 to an additional component including, but not limited to, the torque supplying input or the torque receiving output. In an embodiment, the outer component input/output connector 60 may include a male attachment. The male attachment may include a protrusion. The protrusion may have a non-round or polygonal cross-section. In another embodiment, the outer component input/output connector 60 may include a female attachment. The female attachment may include a bore. The bore may have a non-round or polygonal cross-section.

In an embodiment, the inner component 30 or shaft 4 may include an inner component input/output connector 62. The inner component input/output connector 62 may connect the inner component 30 or shaft 4 to an additional component including, but not limited to, the torque supplying input or the torque receiving output. In an embodiment, the inner component input/output connector 62 may include a male attachment. The male attachment may include a protrusion. The protrusion may have a non-round or polygonal cross-section. In another embodiment, the inner component input/output connector 62 may include a female attachment. The female attachment may include a bore. The bore may have a non-round or polygonal cross-section.

In an embodiment, the torque assembly 2 may include a lubricant 71 on any of its components. The lubricant 71 may include a grease including at least one of lithium soap, lithium disulfide, graphite, mineral or vegetable oil, silicone grease, fluorether-based grease, apiezon, food-grade grease, petrochemical grease, or may be a different type. The lubricant 71 may include an oil including at least one of a Group I-GroupIII+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant 71 may include a solid based lubricant including at least one of lithium soap, graphite, boron nitride, molybdenum disulfide, tungsten disulfide, polytetrafluoroethylene, a metal, a metal alloy, or may be a different type.

In an embodiment, as shown in FIG. 2B, the torque assembly 2 may further include a cup spring washer 70. The cup spring washer 70 may engage or contact the inner component 30 or shaft 4, the outer component 32 (including the first piece 10 or the second piece 12 of the housing), or the tolerance ring 20. In an embodiment, the cup spring washer 70 may include a cup spring washer bore 57. In an embodiment, the cup spring washer 70 may have an inner radius $R_{W1}$ of at least 5 mm, at least 10 mm, at least 15 mm, at least 20 mm, at least 30 mm, at least 40 mm. The inner radius $R_{W1}$ may be no greater than 5 mm, no greater than 10 mm, no greater than 15 mm, no greater than 20 mm, no greater than 30 mm, no greater than 40 mm. In an embodiment, the cup spring washer 70 may have an outer radius $R_{W2}$ of at least 5 mm, at least 10 mm, at least 15 mm, at least 20 mm, at least 30 mm, at least 40 mm. The outer radius $R_{W2}$ may be no greater than 5 mm, no greater than 10 mm, no greater than 15 mm, no greater than 20 mm, no greater than 30 mm, no greater than 40 mm. In an embodiment, the cup spring washer 70 may be made of a material conventional in the art such as, but not limited to, a metal or metal alloy, a polymer, or a composite material.

A method of assembling the torque assembly 2 is recited. In an embodiment, the tolerance ring 20 can be mounted on the inner component 30 in an axially offset manner such that one set of projections 24 projects outward from the surface 7 of the inner component 30. The radial peaks of all the projections 24 therefore lie on a larger diameter than the outer diameter of the annular band 22. This means that the outer diameter of the tolerance ring 20 can be smaller than it would be if the uncompressed projections 24 did not engage the inner component 30 or the outer component 32. In an embodiment, the tolerance ring 20 may be a split ring and may be formed around the surface 7 of the inner component 30.

The combination of the tolerance ring 20 and inner component 30 mounted together in this way may be referred to as a pre-assembly. In an embodiment, the pre-assembly can be inserted axially into the bore 16 in the first piece 10 or second piece 12 of the housing 8 or outer component 30. The diameter of the inner component or shaft 4 may not be larger at its narrowest point than a bore 16 of the first piece 10 or second piece 12 of the housing 8 or outer component 30. In an embodiment, the cup spring washer 70 may be in contact with or otherwise engaged with at least one of the shaft 4 or inner component 32, or the first piece 10 or second piece 12 of the housing 8 or outer component 30. The insertion of the pre-assembly may thus take place with or without compression of the projections 24 between the inner 30 and outer components 32. Insertion can include mating of the inner 30 and outer components 32.

In an embodiment, the inner component 30, the outer component 32 and the tolerance ring 20 can all have similar or differing axial length so that they are substantially aligned in use. In an embodiment, the first piece 10 and second piece 12 of the housing 8 or outer component 30 may be mated together to at least partially enclose the pre-assembly. In an embodiment, the first piece 10 and second piece 12 of the housing 8 or outer component 30 may be mated together via the first coupling component 40 and the second coupling component 42. The first coupling component 40 of the first piece 10 and the second coupling component 42 of the second piece 12 may be tightened or adjusted. As the first coupling component 40 of the first piece 10 and the second coupling component 42 of the second piece 12 are tightened or adjusted, the projections 24 of the tolerance ring 20 are compressed against at least one of the exterior surface 7 of the inner component 30 or the exterior surface 11, 13 of the outer component 32. The resilience of the tolerance ring 18 can retain the projections 24 in a channel between one of the exterior surface 7 of the inner component 30 or the exterior surface 11, 13 of the outer component 32 and thus can prevent it from dropping out of the bore 16. In this way, the torque provided from the torque assembly 2 can be adjusted to its desired torque level or torque value based on the desired application of the torque assembly 2. In this way, the tolerance ring 20 may be adapted to adjust torque by modifying the axial spacing between the inner component 30 and the outer component 32. In this way, the tolerance ring 20 may be adapted to adjust torque by modifying the radial spacing between the inner component 30 and the outer component 32. In this way, tightening or engaging of the first coupling component 40 of the first piece 10 and the second coupling component 42 of the second piece 12 of the torque assembly 2, the transmittable torque between the torque providing input and the torque receiving output may be tightened or adjusted to the desired application, then the torque value may be set constant by use of the locking mechanism 50 which locks the outer component 32 in place with respect to the inner component 30 while locking the tolerance ring 20 between the two components to form a torque constant torque assembly 2. In an embodiment, the locking mechanism 50 may also lock the first piece 10 and second piece 12 of the housing 8 or outer component 30 together to form a torque constant torque assembly 2. In an embodiment, the torque assembly 2 may be tightened to a required torque value of about 1 N·m to about 20 N·m. In an embodiment, the torque assembly 2 may be manually tightened to a required torque value.

In an embodiment, a torque value setting mechanism 72 may be included in the torque assembly. The torque value setting mechanism 72 may indicate to a user the torque value of the torque assembly 2 while the torque is being adjusted via the tightening or engaging of the first coupling component 40 of the first piece 10 and the second coupling component 42 of the second piece 12 of the torque assembly 2. The torque value setting mechanism 72 may include a visual display of the torque value of the torque assembly 2. Once the torque setting mechanism 72 is set, the torque assembly 2 and the tolerance ring 20 can be said to be in a "constant state." In this way, the user can adjust the torque to its desired value by monitoring the torque value setting mechanism 72 before setting it in a "constant state." In an embodiment, the torque value setting mechanism 72 may be located on the torque assembly 2. In an embodiment, the torque value setting mechanism 72 is capable of setting the torque value of the torque assembly at a constant level when engaged or locked via the locking mechanism 50.

In an embodiment, the torque assembly 2 can be installed or assembled by an assembly force of at least 1 kgf in a longitudinal direction relative to the torque supplying input and/or the torque receiving output, such as at least 2 kgf, at least 3 kgf, at least 4 kgf, at least 5 kgf, at least 10 kgf, or even at least 15 kgf. In a further embodiment, the torque assembly 2 can be installed or assembled by an assembly force of no greater than 20 kg in a longitudinal direction to the outer component 32, such as no greater than 19 kgf, no greater than 18 kgf, no greater than 17 kgf, or even no greater than 16 kgf.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A torque assembly comprising: an outer component; an inner component fitted within the outer component; and a tolerance ring provided between the outer component and the inner component to transmit torque between the inner and outer components, wherein torque transferred between the inner and outer components is adjustable by modifying the axial spacing between the inner component and the outer component.

Embodiment 2

A torque assembly comprising: an outer component; an inner component fitted within the outer component; and a tolerance ring provided between the outer component and the inner component comprising a plurality of wave structures about a central axis that define an inner diameter and an outer diameter, at least one of the inner component or outer component abutting against the wave structures, wherein at least one of the inner component, the outer component, or the tolerance ring has a sloped exterior surface in an axial direction.

Embodiment 3

The torque assembly of any one of the preceding embodiments, wherein at least one of the inner component, outer component, or tolerance ring forms a frustoconical or conical shape.

Embodiment 4

The torque assembly of any of the preceding embodiments, further comprising a locking mechanism capable of locking the outer component in place with respect to the inner component.

Embodiment 5

The torque assembly of any one of the preceding embodiments, wherein the outer component comprises a first piece comprises a first coupling component, and a second piece comprising a second coupling component, adapted to couple the first piece to the second piece.

Embodiment 6

The torque assembly of embodiment 5, wherein the first coupling component and second coupling component each comprise screw threads.

Embodiment 7

The torque assembly of any one of the preceding embodiments, wherein the outer component comprises an outer component input/output connector.

Embodiment 8

The torque assembly of embodiment 7, wherein the outer component input/output connector comprises a bore or a protrusion comprising a non-round cross-section.

Embodiment 9

The torque assembly of any one of the preceding embodiments, wherein the inner component comprises an inner component input/output connector.

Embodiment 10

The torque assembly of embodiment 9, wherein the inner component input/output connector comprises a bore or a protrusion comprising a non-round cross-section.

Embodiment 11

The torque assembly of any one of the preceding embodiments, wherein at least one of the inner component or the outer component further comprises a lubricant applied or coated on a surface thereof.

Embodiment 12

The torque assembly of embodiment 11, wherein the lubricant comprises at least one of grease, oil, or solid lubricant.

Embodiment 13

The torque assembly of embodiment 2, wherein a radius of the outer component $R_H$ with respect to the central axis is less than about 20 mm.

Embodiment 14

The torque assembly of any one of the preceding embodiments, further comprising a cup spring washer in contact with the outer component and the inner component.

Embodiment 15

The torque assembly of any one of the preceding embodiments, wherein the torque assembly is adjustable between a torque value of about 1 to about 20 N·m between the inner component and the outer component.

Embodiment 16

The torque assembly of embodiment 15, wherein the torque assembly has a torque value setting mechanism capable of setting the torque value of the torque assembly at a constant level when engaged.

Embodiment 17

The torque assembly of any one of the preceding embodiments, wherein the tolerance ring is adapted to adjust torque by modifying the radial spacing between the inner component and the outer component.

Embodiment 18

The torque assembly of embodiment 2, wherein the sloped exterior surface of the inner component, the outer component, or the tolerance ring forms an angle α with respect to a line parallel to the central axis, and wherein a is at least 1° or at least 5° or at least 10°.

Embodiment 19

The torque assembly of embodiment 2, wherein the sloped exterior surface of at least one of the inner component, outer component, or tolerance ring is adapted to frictionally engage at least one of an inner component, outer component, or tolerance exterior surfaces.

Embodiment 20

The torque assembly of embodiment 2, wherein at least one wave structure is adapted to deform via compression in the radial direction.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A torque assembly comprising:
   an outer component;
   an inner component fitted within the outer component; and
   a tolerance ring provided between the outer component and the inner component to transmit torque between the inner and outer components, wherein torque transferred between the inner and outer components is adjustable by modifying the axial spacing between the inner component and the outer component, wherein the tolerance ring comprises an annular band including at least one wave structure forming an apex.

2. The torque assembly of claim 1, wherein at least one of the inner component, outer component, or tolerance ring forms a frustoconical or conical shape.

3. The torque assembly of claim 1, further comprising a locking mechanism capable of locking the outer component in place with respect to the inner component.

4. The torque assembly of claim 1, wherein the outer component comprises a first piece comprises a first coupling component, and a second piece comprising a second coupling component, adapted to couple the first piece to the second piece.

5. The torque assembly of claim 4, wherein the first coupling component and second coupling component each comprise screw threads.

6. The torque assembly of claim 1, wherein the outer component comprises an outer component input/output connector.

7. The torque assembly of claim 6, wherein the outer component input/output connector comprises a bore or a protrusion comprising a non-round cross-section.

8. The torque assembly of claim 1, wherein the inner component comprises an inner component input/output connector.

9. The torque assembly of claim 8, wherein the inner component input/output connector comprises a bore or a protrusion comprising a non-round cross-section.

10. The torque assembly of claim 1, wherein at least one of the inner component or the outer component further comprises a lubricant applied or coated on a surface thereof.

11. The torque assembly of claim 10, wherein the lubricant comprises at least one of grease, oil, or solid lubricant.

12. The torque assembly of claim 1, further comprising a cup spring washer in contact with the outer component and the inner component.

13. The torque assembly of claim 1, wherein the torque assembly is adjustable between a torque value of about 1 to about 20 Nm between the inner component and the outer component.

14. The torque assembly of claim 13, wherein the torque assembly has a torque value setting mechanism capable of setting the torque value of the torque assembly at a constant level when engaged.

15. The torque assembly of claim 1, wherein the tolerance ring is adapted to adjust torque by modifying the radial spacing between the inner component and the outer component.

16. A torque assembly comprising:
    an outer component;
    an inner component fitted within the outer component; and
    a tolerance ring provided between the outer component and the inner component comprising a plurality of wave structures forming apexes about a central axis that define an inner diameter and an outer diameter, at least one of the inner component or outer component abutting against the wave structures, wherein at least one of the inner component, the outer component, or the tolerance ring has a sloped exterior surface in an axial direction.

17. The torque assembly of claim 16, wherein the sloped exterior surface of the inner component, the outer component, or the tolerance ring forms an angle α with respect to a line parallel to the central axis, and wherein a is at least 1°.

18. The torque assembly of claim 16, wherein the sloped exterior surface of at least one of the inner component, outer component, or tolerance ring is adapted to frictionally engage at least one of an inner component, outer component, or tolerance ring exterior surfaces.

19. The torque assembly of claim 16, wherein at least one wave structure is adapted to deform via compression in the radial direction.

20. The torque assembly of claim 16, wherein a radius of the outer component $R_H$ with respect to the central axis is less than about 20 mm.

* * * * *

UNITED STATES PATENT AND TRADEMARK OFFICE
CERTIFICATE OF CORRECTION

PATENT NO. : 10,738,836 B2
APPLICATION NO. : 15/825346
DATED : August 11, 2020
INVENTOR(S) : James K. Burgess et al.

Page 1 of 1

It is certified that error appears in the above-identified patent and that said Letters Patent is hereby corrected as shown below:

In the Specification

Column 5, Line 20, please delete "radius $R_H$", and insert --radius $R_{T1}$--

Column 5, Line 22, please delete "radius $R_H$", and insert --radius $R_{T1}$--

Column 12, Line 46, please delete "wherein a is", and insert --wherein $\alpha$ is--

In the Claims

Column 14, Line 23, please delete "20 Nm", and insert --20 N·m--

Column 14, Line 49, please delete "wherein a is", and insert --wherein $\alpha$ is--

Signed and Sealed this
Twenty-third Day of August, 2022

Katherine Kelly Vidal
*Director of the United States Patent and Trademark Office*